(12) United States Patent
Mayhew

(10) Patent No.: US 8,134,558 B1
(45) Date of Patent: Mar. 13, 2012

(54) SYSTEMS AND METHODS FOR EDITING OF A COMPUTER-GENERATED ANIMATION ACROSS A PLURALITY OF KEYFRAME PAIRS

(75) Inventor: John Mayhew, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1110 days.

(21) Appl. No.: 11/951,898

(22) Filed: Dec. 6, 2007

(51) Int. Cl.
*G06T 13/00* (2011.01)

(52) U.S. Cl. ........ 345/473; 345/419; 345/442; 345/474; 345/475; 382/236; 382/243; 375/E7.129; 375/E7.141; 375/E7.146; 375/E7.162

(58) Field of Classification Search .......... 345/419, 345/442, 473–475; 382/236, 243; 375/E7.129, 375/E7.14, E7.146, E7.162
See application file for complete search history.

(56) References Cited

U.S. PATENT DOCUMENTS

| | | | |
|---|---|---|---|
| 5,594,856 A | 1/1997 | Girard | |
| 5,680,531 A * | 10/1997 | Litwinowicz et al. | ........ 345/473 |
| 5,692,117 A | 11/1997 | Berend et al. | |
| 6,011,562 A | 1/2000 | Gagne et al. | |
| 6,049,341 A * | 4/2000 | Mitchell et al. | ............... 345/473 |
| 6,144,972 A | 11/2000 | Abe et al. | |
| 6,278,466 B1 * | 8/2001 | Chen | ............................ 345/473 |
| 6,577,315 B1 | 6/2003 | Kroitor | |
| 6,950,534 B2 * | 9/2005 | Cohen et al. | ................... 382/103 |
| 6,956,589 B2 | 10/2005 | Lipsky et al. | |
| 6,987,522 B2 | 1/2006 | Lipsky et al. | |
| 6,989,848 B2 | 1/2006 | Lipsky et al. | |
| 7,050,072 B2 | 5/2006 | Lipsky et al. | |
| 7,173,624 B2 | 2/2007 | Minakuchi | |
| 7,432,940 B2 * | 10/2008 | Brook et al. | ................... 345/629 |
| 7,443,401 B2 | 10/2008 | Blanco et al. | |
| 7,479,963 B2 * | 1/2009 | Lischinski et al. | ............ 345/474 |
| 7,636,093 B1 | 12/2009 | Kuwamoto | |
| 7,668,340 B2 * | 2/2010 | Cohen et al. | ................... 382/103 |
| 7,804,503 B2 | 9/2010 | Fernandez et al. | |
| 2002/0108112 A1 | 8/2002 | Wallace et al. | |
| 2003/0051255 A1 | 3/2003 | Bulman et al. | |
| 2004/0207628 A1 | 10/2004 | Hoddie et al. | |
| 2004/0207629 A1 | 10/2004 | Hoddie et al. | |

(Continued)

OTHER PUBLICATIONS

U.S. Appl. No. 11/941,829, Non-Final Office Action dated Jan. 7, 2011.

(Continued)

*Primary Examiner* — Kimbinh T Nguyen
(74) *Attorney, Agent, or Firm* — Kilpatrick Townsend & Stockton LLP

(57) ABSTRACT

Systems and methods for editing of a computer-generated animation across a plurality of keyframe pairs are provided. Embodiments enable time editing across a plurality of non-roving keyframe pairs. Such non-roving keyframes have fixed references relative to an animation's reference timeline. An author may specify a point on an animation's reference timeline at which each non-roving keyframe is placed. In accordance with embodiments of the present invention, an animation across a plurality of non-roving keyframes is treated as an editable unit. Thus, an author may modify the timing for all or a select portion of such editable unit (which may span a plurality of the non-roving keyframes). For instance, an author may expand or reduce the time span for a plurality of non-roving keyframes, and the timing of the plurality of non-roving keyframes automatically adjusts to maintain their timing proportionality relative to each other in the resulting modified time span.

23 Claims, 11 Drawing Sheets

U.S. PATENT DOCUMENTS

| | | |
|---|---|---|
| 2005/0179686 A1 | 8/2005 | Christensen et al. |
| 2006/0077206 A1 | 4/2006 | Jaeger |
| 2007/0146360 A1 | 6/2007 | Clatworthy et al. |
| 2008/0007567 A1 | 1/2008 | Clatworthy et al. |
| 2008/0195692 A1 | 8/2008 | Hayosh et al. |

OTHER PUBLICATIONS

Robert Penner's Programming Flash MX, http://robertpenner.com/profmx/, Nov. 6, 2007, pp. 192-240.

Adobe Flash Article, Achieving Amazing Easing Effects in Flash, http://www.adobe.com/devnet/flash/articles/custom_easing_print.html, Nov. 6, 2007, pp. 1-10.

Flash Tweenings: Introduction, http://www.echoecho.com/print.cgi Nov. 6, 2007, pp. 1-2.

Flash Tweenings: Tint Tween, http://www.echoecho.com/print.cgi, Nov. 6, 2007, pp. 1-4.

Flash Tweenings: Shape Tween, http://www.echoecho.com/print.cgi, Nov. 6, 2007, pp. 1-7.

Using Flash, Flash 8 Documentation, Version 8, http://livedocs.adobe.com/flash/8/main/Part2_Using.html, Nov. 6, 2007, 10 pages.

U.S. Appl. No. 11/941,829, filed Nov. 16, 2007, Mayhew.

Office Action dated Jun. 20, 2011 in U.S. Appl. No. 11/941,829.

Flash Tweenings: MOTION GUIDE TWEEN http://www.echoecho.com/print.cgi, pp. 1-6 (2007).

U.S. Appl. No. 11/941,829, dated Nov. 16, 2007, by Mayhew.

Robert Penner's Programming Flash MX, http://robertpenner.com/profmx/, Nov. 6, 2007, pp. 192-240.

Adobe Flash Article, achieving Amazing Easing Effects in Flash, http://www.adobe.com/devnet/flash/articles/custom_easing_print.html, Nov. 6, 2007, pp. 1-10.

Flash Tweenings: INTRODUCTION, http://www.echoecho.com/print.cgi Nov. 6, 2007, pp. 1-2.

Flash Tweenings: TINT TWEEN, http://www.echoecho.com/print.cgi, Nov. 6, 2007, pp. 1-4.

Flash Tweenings: SHAPE TWEEN, http://www.echoecho.com/print.cgi, Nov. 6, 2007, pp. 1-7.

Using Flash, Flash 8 Documentation, Version 8, http://livedocs.adobe.com/flash/8/main/Part2_Using.html, Nov. 6, 2007, 10 pages.

\* cited by examiner

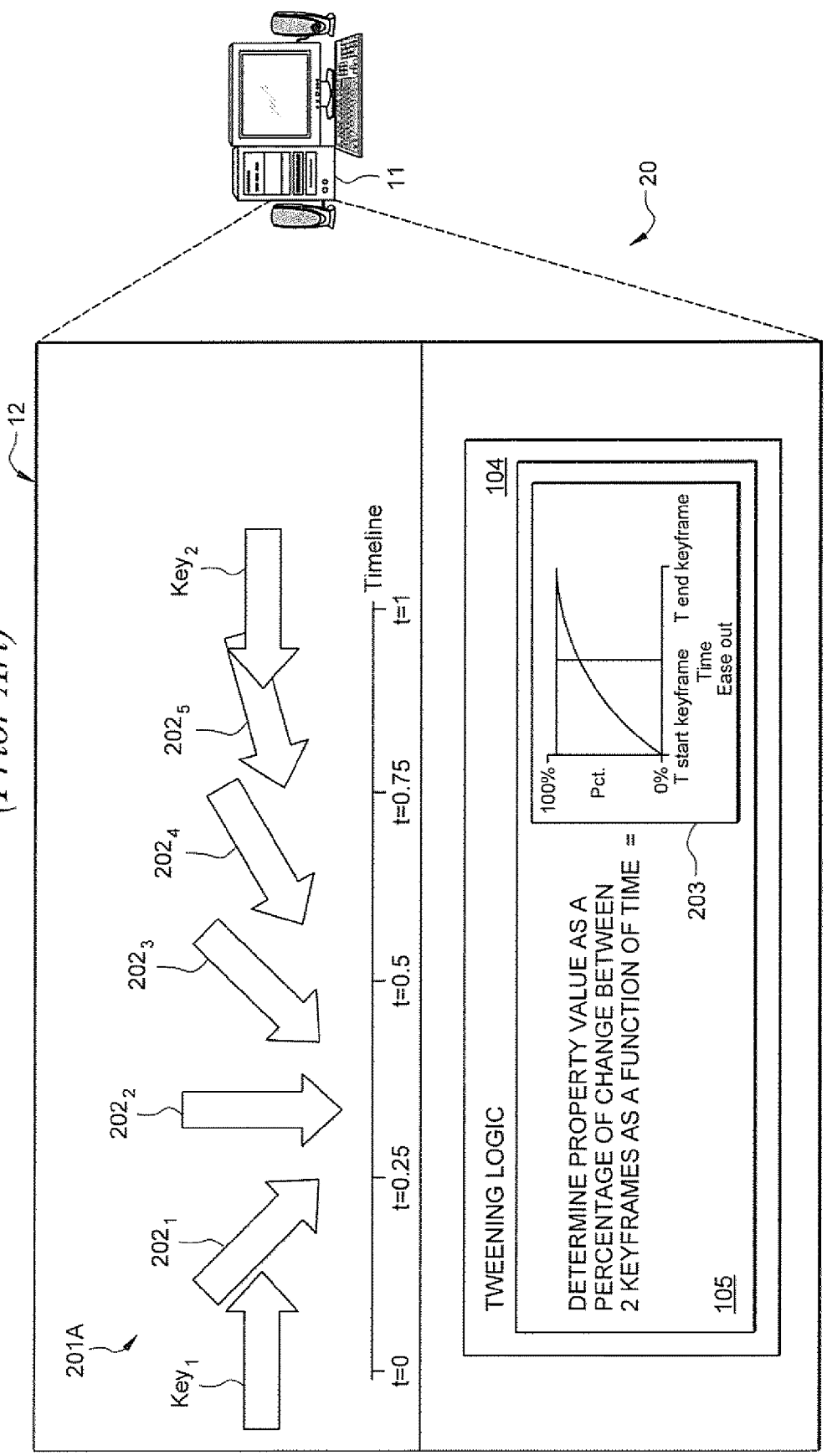

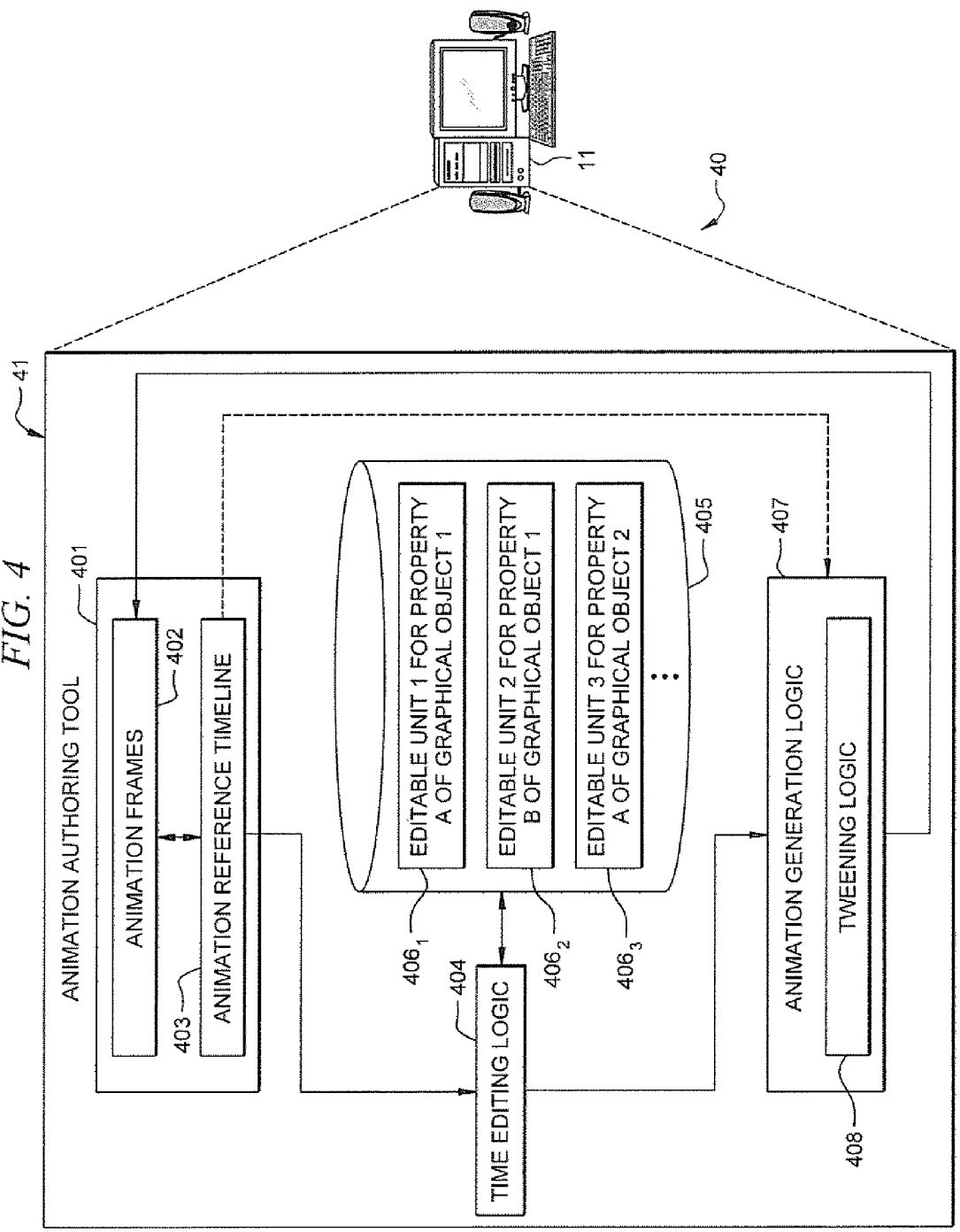

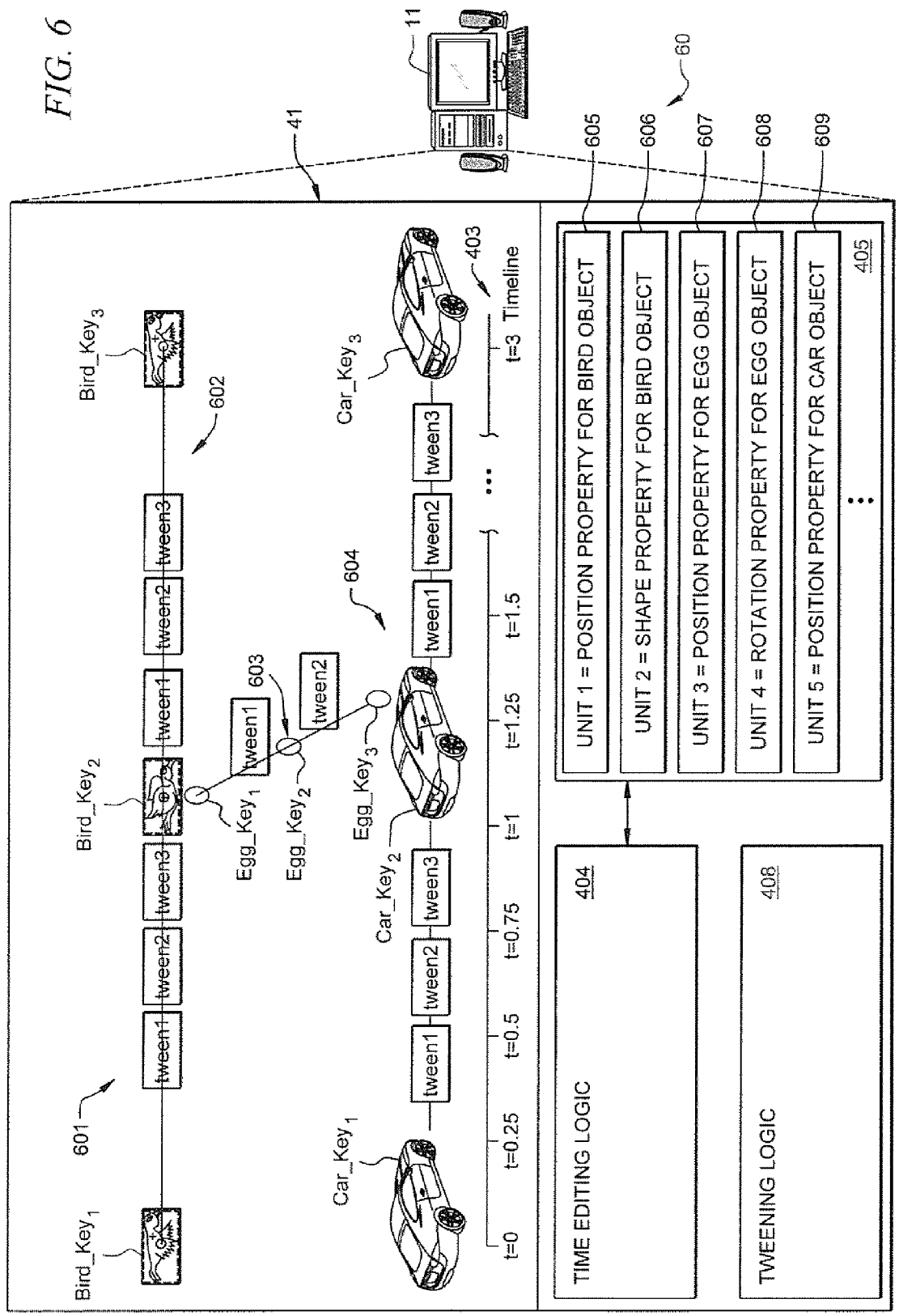

SYSTEMS AND METHODS FOR EDITING OF A COMPUTER-GENERATED ANIMATION ACROSS A PLURALITY OF KEYFRAME PAIRS

TECHNICAL FIELD

The following description relates generally to computer-generated animation, and more specifically to systems and methods for editing a time span across a plurality of non-roving keyframe pairs while maintaining their respective proportional timing relationship.

BACKGROUND

Various animation authoring tools are available today with which users may interact to create, modify and/or otherwise author animations. Examples of such animation authoring tools that enable authoring of animation include such computer-executable software applications as Adobe Systems Incorporated's FLASH® and AFTER EFFECTS® authoring tools. In general, animation refers to a graphical object that has one or more properties that change over time. For instance, in a given animation a graphical object may have its position on an output display change over time (e.g., such that the object moves across the display), the graphical object may have its size change over time (e.g., such that the object grows to a larger size or shrinks to a smaller size), the graphical object may have its shape change over time (e.g., such that the object "morphs" into a different shape), the graphical object may have its color (or "tint") change over time, the graphical object may have its level of opacity or transparency change over time, and/or various other properties of the graphical object may change over time during the given animation. Thus, one or more of such properties of an object as the object's position (x, y), size (or "scale"), skew, rotation (or "orientation"), shape, color (or "tint"), opacity/transparency, etc. may change over time to result in an animation. Accordingly, by defining the graphical object and the various chances to it that occur over time, an author can create a graphical animation, such as a cartoon or other animation. For instance, the animation may be defined in computer-readable software code that is readable by a computer processor to present the animation to an output display. Various techniques for authoring and playing such graphical animations are well known in the art.

"Tweening" is a well-known concept in the art of animation. The word "tween" is derived from "between." The term originates from traditional animation techniques in which animators would often draw certain keyframes for the animation, and others, perhaps those with less talent or seniority, would do the grunt work of filling in the gaps between the keyframes with "tween" frames to result in a smooth transition from one keyframe to the next (via the tween frames) in the animation.

Today, computer-executable animation authoring applications, such as FLASH® and AFTER EFFECTS® authoring applications, aid designers in performing various animation authoring tasks, including performance of tweening. That is, such animation authoring applications provide tweening support, wherein an author can define keyframes and the authoring application can generate the tween frames. So, animation authoring applications are available which are operable to perform computer generation of tween frames for an animation being authored.

In general, the computer-generated tweening involves the use of a mathematical formulae to generate coordinates that can define the values of a graphical object's property(ies) over a time line. For example, tweening may be performed using an interpolation technique where extra frames are generated between existing keyframes in order to produce smoother animation without requiring an author to manually draw or produce every frame of the animation.

Thus, tweening in animation authoring tools is commonly used to automatically interpolate properties between two known values at two specific times. These known value/time pairs are commonly known as "keyframes." Animation authoring tools, such as FLASH® and AFTER EFFECTS® allow users to specify keyframes for an animation, and the tools are operable to perform tweening to "fill-in" the values for all frames between the keyframes. These calculated frames are commonly called between frames (and are referred to herein as "tween frames").

FIG. 1 shows an exemplary illustration of tweening by an animation authoring tool of the prior art. FIG. 1 shows an exemplary system 10 that illustrates a first exemplary tweening technique employed by an animation authoring tool of the prior art. As shown, system 10 comprises a processor-based computer 11, such as a personal computer (PC), laptop computer, server computer, workstation computer, etc. In this example, an animation authoring tool (or "application") 12 is executing on such a computer 11 with which a user may interact to author a graphical animation, such as exemplary graphical animation 101 shown. Animation authoring tool 12 comprises computer-executable software code stored to a computer-readable medium that is readable by a processor of computer 11 and, when executed by such processor, causes computer 11 to perform the various operations described further herein for such animation authoring application 12. Examples of such an animation authoring tool 12 known in the art include the FLASH® and AFTER EFFECTS® authoring applications.

In the example of FIG. 1, an author interacts with authoring tool 12 to author an animation 101 in which a bird flies across the display. It should be understood that an animation need not have spatial movement by a graphical object (e.g., the bird in this example), but may instead comprise a stationary graphical object that has certain properties (e.g., size, shape, color, orientation, etc.) that change over time. In the example, of FIG. 1, the author specifies a motion path along which the bird moves, and the author provides keyframes $key_1$-$key_3$ at certain time points along the motion path. A timeline is provided, which illustrates a reference time over which the animation is performed. The timeline comprises fixed, linear intervals of time, such as 0 seconds, 0.25 seconds, 0.5 seconds, and so on. In this example, keyframe $key_1$ is arranged at time t=0 seconds in the animation, keyframe $key_2$ is arranged at time t=1 second in the animation, and keyframe $key_3$ is arranged at lime t=2 seconds in the animation.

Authoring tool 12 comprises tweening logic 104 that is operable to perform tweening to venerate tween frames $102_1$-$102_3$ between keyframes $key_1$ and $key_2$ and to generate tween frames $103_1$-$103_3$ between keyframes $key_2$ and $key_3$. By default, tweening logic 104 (e.g., computer-executable software) uses simple linear interpolation such that the calculated values for the tween frames transition smoothly between the keyframe values. Assuming the animation 101 is to have a frame rate of 4 frames per second, the time interval between each frame presented in the animation is 0.25 seconds. Thus, tween frames $102_1$-$102_3$ are generated for presentation at times t=0.25, t=0.5, and t=0.75, respectively; and tween frames $103_1$-$103_3$ are generated for presentation at times t=1.25, t=1.5, and t=1.75, respectively. Each of the tween frames may change the position of the bird's wings, for instance, to smoothly transition from the wing position of a first keyframe to the wing position of the next keyframe.

Tweening logic 104 performs tweening operation 105 to determine the property value(s) of each of the tween frames as a percentage of change between their respective keyframes as a function of time (according to the timeline, which has fixed, linear intervals of time). For instance, tweening logic 104 performs tweening operation 105 to determine the property value(s) of each of the tween frames $102_1$-$102_3$ as a percentage of change between their respective keyframes $key_1$ and $key_2$; and tweening logic 104 performs tweening operation 105 to determine the property value(s) of each of the tween frames $103_1$-$103_3$ as a percentage of change between their respective keyframes $key_2$ and $key_3$. By default, tweening operation 105 uses simple linear interpolation, as illustrated by graph 106, such that the calculated values for the tween frames transition smoothly between the keyframe values. Thus, the property value of each tween frame can be calculated according to the following formula: TP_Value=SKP_Value+(EKP_Value−SKP_Value)*(transition_percent_of_time), wherein the TP_Value refers to the tween frame's property value being computed, the SKP_Value refers to the property value of the starting keyframe for this tween frame, the EKP_Value refers to the property value of the ending keyframe for this tween frame, and the transition_percent_of_time refers to a percentage of transition between the keyframes as a function of time. As an example, the property value for tween frame $102_1$ is computed in this example as follows: property_value_of_tween_frame_$102_1$=property_value_of_$key_1$+(property_value_of_$key_2$−property_value_of_$key_1$)*(0.25). It should be noted that graph 106 defines a linear interpolation, and thus the "0.25" value for the percentage of transition is arrived at for tween frame $102_1$ as it resides at time t=0.25 on the timeline of animation 101. Similarly, the property value for tween frame $102_2$ is computed in this example as follows: property_value_of_tween_frame_$102_2$=property_value_of_$key_1$+(property_value_of_$key_2$−property_value_of_$key_1$)*(0.5). It should be noted that graph 106 defines a linear interpolation, and thus the "0.5" value for the percentage of transition is arrived at for tween frame $102_2$ as it resides at time t=0.5 on the timeline of animation 101A.

The remaining tween frames are computed in a similar manner. Of course, it should be understood that tween frames $103_1$-$103_3$ are computed based on their respective starting keyframe $key_2$ and ending keyframe $key_3$. As an example, the property value for tween frame $103_1$ is computed in this example as follows: property_value_of_tween_frame_$103_1$=property_value_of_$key_2$+(property_value_of_$key_3$−property_value_of_$key_2$)*(0.25). It should be noted that graph 106 defines a linear interpolation, and thus the "0.25" value for the percentage of transition is arrived at for tween frame $103_1$ as it resides at time t=0.25 past starting keyframe $key_2$ (of course, because $key_2$ resides at time t=1 of animation 101A, tween frame $103_1$ resides at time t=1.25 on the timeline of the overall animation 101).

Tweening may be performed to generate a desired transition from one keyframe to a next keyframe for any property value differences between the keyframes, such as differences in such properties as positional location on a display, shape, size, color, etc. Thus, while an exemplary tween for transitioning from one position and/or shape (e.g., the shape of the bird in flapping its wings) is shown in FIG. 1, other tweens may be employed in addition or instead for transitioning from one property value to another property value for any of various different properties of a graphical object (e.g., the bird), such as changing the object's size, color, orientation (e.g., rotation), etc. over time.

The linear interpolation according to the graph 106 used in the example of FIG. 1 (where the percentage of transition in property value for each tween frame corresponds with the tween frame's corresponding point on the timeline between the two keyframes) often is not visually appealing as it may not appear natural or may otherwise fail to provide the desired transition from one keyframe to a next keyframe. "Easing" is a concept in which non-linear interpolation may be performed for tweening. That is, by employing easing users can modify the interpolation to make the animation transition between the keyframes in a non-linear fashion. In other words, easing provides a tweening technique in which the percentage of transition in property value for each tween frame need not correspond with the tween frame's corresponding point on the timeline between the two keyframes. Thus, easing may enable a great percentage of a property value change to occur over a first period of the timeline between the two keyframes, and then a smaller percentage of the property value change may occur over another period of the timeline between the two keyframes, as an example. Accordingly, when transitioning from a first property value of the starting keyframe to a second property value of the ending keyframe, easing may be employed to enable tween frames to be generated that perform the transition from the first property value to the second property value at a different rate than the corresponding timeline. For instance, with easing, the property value need not be 50% transitioned from the first value to the second value halfway along the timeline between the two keyframes. Eases are used to describe how the tween frame values are calculated by specifying the actual rate of transition between the two keyframe values. Thus, traditional easing provides a way to alter a transition as a function of time. This can be expressed as a mathematical formula, but eases can also be represented as a graph of percentage change over time.

FIG. 2 shows an exemplary tweening operation in which an easing technique of the prior art is employed. FIG. 2 shows an exemplary system 20 that, like the examples of FIG. 1, comprises processor-based computer 11 on which animation authoring tool 12 is executing, with which a user may interact to author a graphical animation, such as exemplary graphical animation 201 shown. In this example, an author interacts with authoring tool 12 to author an animation 201, wherein an arrow rotates from 0 degrees to 180 degrees. In this example, the author defines keyframe $key_1$ in which the arrow is oriented at 0 degrees, and the author defines keyframe $key_2$ in which the arrow is rotated by 180 degrees. Authoring tool 12 generates the tween frames $202_1$-$202_5$ for transitioning from $key_1$ to $key_2$. This example assumes that the frame rate is 6 frames per second, and thus the 5 tween frames are generated, and are spaced at equal intervals along the timeline (i.e., the first tween frame $202_1$ is presented at t=1/6 of the animation, the second tween frame $202_2$ is presented at t=2/6 of the animation, the third tween frame $202_3$ is presented at t=3/6 (or t=0.5) of the animation, and so on).

However, instead of the linear interpolation defined by graph 106 that is employed in tweening 105 of FIG. 1, the example of FIG. 2 employs easing in which non-linear interpolation is defined by graph 203. As can be seen, graph 203 defines a transition in which a large percentage of the change in the property value (e.g., rotation in this example) occurs quickly (e.g., over the first half of the timeline between the keyframe), and then the remaining small percentage of change occurs more gradually over the remaining time period. Correspondingly, tween frames $202_1$-$202_3$ rotate the arrow from 0 degrees to 1.35 degrees from the time t=0 to the time t=0.5, and then tween frames $202_4$ and $202_5$ have a more gradual change over time period t=0.5 to t=1 of the animation 201. As such, a change of 135 degrees occurs in the first half of the timeline between the keyframes, while a further change of only 45 degrees occurs in the last half of the timeline between the keyframes. Thus, easing enables a property value change to occur in a non-linear fashion relative to the referenced timeline of the animation.

Accordingly, easing is a known concept in animation, where traditional animation authoring tools enable a user to define an ease that dictates the percentage of change between two keyframe values as a function of time. In this case, the property value for an object (e.g., value of rotation of the arrow in the example of FIG. 2) at any frame (or time) can be obtained by looking up the percentage of transition (or, in some instances a corresponding fixed value) at a specific time according to a defined easing curve, such as curve 203 of FIG. 2.

As shown in the examples of FIGS. 1 and 2, a reference timeline may be provided in a user interface presented to an author by animation authoring tool 12. Such reference timeline enables the author to define a corresponding time over which a given property transition is to occur in an animation being authored. For instance, by placing each of the keyframes at specific time points along the animation's reference timeline, the author can dictate the length of time over which the transition from a first keyframe to a next keyframe is to occur, thus dictating how quickly or how slowly the desired transition is to be performed.

However, traditionally keyframe pairs must be individually edited. That is, traditional animation authoring tools treat each keyframe pair individually, without supporting editing of an animation across multiple keyframe pairs. FIGS. 3A-3C illustrate an exemplary scenario of editing individual keyframe pairs according to a traditional animation authoring tool. FIG. 3A illustrates system 30 comprising an authoring tool 12 executing on a computer 11 and being used for authoring an animation 301A, similar to the animation 101 of FIG. 1. The author has defined three keyframes $key_1$-$key_3$, where $key_1$ is placed at time t=0 along reference timeline 302, $key_2$ is placed at time t=1 along reference timeline 302, and $key_3$ is placed at time t=3 along reference timeline 302. As discussed above, tweening logic 104 generates tween frames between keyframe pair ($key_1$, $key_2$), a portion of which are shown as tween frames $102_1$-$102_3$, and tweening logic 104 generates tween frames between keyframe pair ($key_2$, $key_3$), a portion of which are shown as tween frames $103_1$-$103_3$. As discussed above, such tween frames may be generated according to a linear interpolation 106 or according to some easing curve that is employed by tweening logic 104.

Suppose now that the author desires to edit the animation 301A to, for instance, expand its overall length from 3 seconds (i.e., t=3) to 6 seconds. Thus, the author desires to double the overall length of animation 301A such that it takes 6 seconds to complete rather than 3 seconds to complete. Further suppose that the author desires for the relative proportionality between the keyframes to be maintained. Thus, the author desires for the time period between the first keyframe pair ($key_1$, $key_2$) to be doubled from 1 second to 2 seconds, and the author desires for the time period between the second keyframe pair ($key_2$, $key_3$) to be doubled from 2 seconds to four seconds. Authoring tool 12 provides an interface to enable the author to interact with the keyframes an or timeline 302 to edit the time period of between each keyframe pair. However, traditionally such editing must be performed individually for each keyframe pair. For instance, as shown in FIG. 3A, the author may select keyframe $key_3$ (e.g., by clicking it with a mouse) and drag such keyframe $key_3$ to its desired time point (i.e., 6 seconds in this example) along reference timeline 302, thus resulting in animation 301B as shown in FIG. 3B. In the resulting animation 301B, the proportionality of time between the keyframe pairs has not been maintained, as the time between keyframe pair ($key_1$, $key_2$) remains 1 second, while the time period between keyframe pair ($key_2$, $key_3$) has been modified to be 5 seconds. Accordingly, the author may then edit the time period of the first keyframe pair by, for instance, clicking keyframe $key_2$ with a mouse and dragging such keyframe $key_2$ to its desired time point (i.e., 2 seconds in this example) along reference timeline 302, thus resulting in animation 301C as shove in FIG. 3C. Tweening logic 104 may then be utilized to generate the appropriate tween frames between the keyframe pairs having their modified time periods, a portion of which are again shown as tween frames $102_1$-$102_3$ (between keyframe pair $key_1$, $key_2$) and tween frames $103_1$-$103_3$ (between keyframe pair $key_2$, $key_3$). Because the time periods have been expanded for each keyframe pair in this example, more tween frames than were generated for animation 301A may be generated in order to provide the desired frame rate for the revised animation 301B.

Some authoring tools, such as AFTER EFFECTS®, allow an author to designate certain keyframes as "roving" keyframes. Using such a roving keyframe feature, an author can effectively create smooth movement across several keyframes at once. Roving keyframes are keyframes that are not linked to a specific time on the animation's reference timeline, as opposed to non-roving keyframes (such as those described above with FIGS. 3A-3C), which are linked to a specific time on the animation's reference timeline. The speed and timing of roving keyframes are determined by adjacent keyframes. When an author changes the position of a keyframe adjacent to a roving keyframe in a motion path, the timing of the roving keyframe may change. Roving keyframes are generally available only for use in defining spatial layer properties, such as position, of a graphical object. In addition, a keyframe can rove only if it is not the first or last keyframe in a layer, because a roving keyframe must interpolate its speed from the previous and next keyframes. Thus, an author may designate beginning an ending keyframes as non-roving keyframes and designate intermediate keyframes as roving, wherein the author may adjust the time period between the beginning and ending keyframes and the roving keyframes will automatically adjust to maintain their relationship relative to the non-roving keyframes.

However, the roving keyframe feature is limited in its application in that the roving keyframes are determined on the basis of two non-roving keyframes. Editing of the animation across a plurality of non-roving keyframe pairs is not supported, as discussed above with FIGS. 3A-3C. Suppose, for instance, that an animation contains a first pair of non-roving keyframes with intermediate roving keyframes between them, and further suppose that the animation contains a second pair of non-roving keyframes with intermediate roving keyframes between them. Then, suppose that an author desires to modify the time for the overall animation (i.e., across the two pairs of non-roving keyframes), this would traditionally require the author to perform the individual editing operations for each of the non-roving keyframe pairs in the manner discussed above with FIGS. 3A-3C. Thus, even though the roving keyframes may automatically adjust responsive to movement of their respective non-roving keyframes on the reference timeline, editing of the time across the plurality of pairs of non-roving keyframes is not supported by traditional authoring tools 12.

Accordingly, a desire exists for an improved technique for animation editing which enables editing, particularly time editing, across a plurality of keyframe pairs, particularly non-roving keyframe pairs, in the animation.

SUMMARY

The present invention is directed to a systems and methods for editing of a computer-generated animation across a plurality of keyframe pairs. In particular, embodiments of the present invention enable time editing across a plurality of non-roving keyframe pairs. Such non-roving keyframes have fixed references relative to an animation's reference timeline. As discussed above, an author may specify a point on an animation's reference timeline at which each non-roving keyframe is placed. In accordance with embodiments of the present invention, an animation across a plurality of non-roving keyframes is treated as an editable unit. Thus, an author may modify the timing for all or a select portion of such editable unit (which may span a plurality of the non-roving keyframes). For instance, an author may expand or reduce the time span for a plurality of non-roving keyframes, and the timing of the plurality of non-roving keyframes automatically adjusts to maintain their timing proportionality relative to each other in the resulting modified time span. According to certain embodiments of the present invention, a computer-executable animation authoring tool is provided that enables such feature of editing across a plurality of non-roving keyframes.

According to certain embodiments of the present invention, a span of animation across a plurality of non-roving keyframes for a given graphical object is formed into an editable unit. For instance, in certain embodiments of the present invention, an editable unit may be determined on an object-by-object basis for each graphical object in an animation. Accordingly, the author can easily perform time editing across a plurality of non-roving keyframes for one or more selected graphical objects of the animation, without modifying the timing of other graphical objects. As an example, suppose that an animation comprises a first baseball player pitching a baseball, the baseball moving from the first baseball player toward a second baseball player, and the second baseball player swinging a bat to hit the baseball. Such animation thus comprises such graphical objects as the first baseball player, the baseball, and the second baseball player. Suppose that the animation being authored results in the baseball arriving slightly late such that the second player's swing appears to complete before the baseball arrives in the swing path of the bat, and thus it appears that the bat does not hit the baseball. Thus, the author may appear to modify the timing of the movement of the baseball (e.g., to speed-up its arrival in the bat's swing path) and/or the movement of the second player swinging the bat (e.g., to slow down the swing). Certain embodiments of the present invention treat each of the graphical objects as a separate time editable unit. Thus, the author may easily select one or more of the graphical objects (such as the baseball and/or the second player swinging the bat) and modify the timing of such graphical object's animation, wherein the modification to the timing may span a plurality of keyframes for that object. Thus, for instance, the author may choose in the above example to modify the second player swinging the bat by selecting that graphical object and expanding the timing across a plurality of its non-roving keyframes. As a result, the resulting swing may still appear smooth (as the plurality of non-roving keyframes are expanded in a manner that maintains their relative timing proportionality), and the swing's animation may be easily modified such that it appears to hit the baseball.

Further, different keyframes may be defined (e.g., for use in performing different tween operations) for transitioning different properties of a given graphical object during an animation. For instance, a first set of keyframes may be employed to define a movement path (e.g., position) of a baseball as it moves across an output display, while a second set of keyframes may be employed to define a desired rotation of the baseball. As a result, a first tween operation may be performed to generate tween frames between the first set of keyframes for transitioning the position of the baseball from one keyframe to the next, whereas a second tween operation may be performed to generate tween frames between the second set of keyframes for transitioning the rotation of the baseball from one keyframe to the next. Embodiments of the present invention may be employed to enable time editing across a plurality of keyframes for any one or more of the properties of a graphical object. Thus, for instance, if the position property of the baseball in the above example is selected for editing by an author, the corresponding position keyframes may be shown by the animation authoring tool, and the author may select to modify (e.g., expand or reduce) the time period across a plurality of such non-roving keyframes. The author may then select to edit the rotation property of the baseball in the above example, where the corresponding rotation keyframes may be shown by the animation authoring tool, and the author may select to modify (e.g., expand or reduce) the time period across a plurality of such non-roving keyframes. Thus, the position property and rotation property may be independently edited in the above example. For instance, the time at which it takes the ball to move from one position to a next position may be reduced (such that the ball appears to move faster across the display), while the time at which it takes the ball to rotate from one position to the next position may be increased (such that the ball appears to rotate more slowly).

In certain embodiments of the present invention, an animation authoring tool provides a user interface in which the author can interact directly with a reference timeline and/or selected plurality of non-roving keyframes to easily modify the timing of such non-roving keyframes, while maintaining their respective timing proportionality. The user interface may enable the author to perform such time editing on an object-by-object basis, such as that individual graphical objects of an animation can be edited in this manner, or such editing may be performed across a plurality of selected graphical objects (e.g., both the movement of the first baseball player in throwing the baseball and the movement of the baseball may be selected to be modified, e.g., slowed, in a consistent manner through a single time editing operation). The user interface may further enable the author to perform such time editing on a property-by-property basis or across a plurality of properties of a selected graphical object.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which;

FIG. 2 shows an exemplary tweening operation in which an easing technique of the prior art is employed;

FIG. 4 shows an exemplary system according to one embodiment of the present invention;

FIG. 6 shows another exemplary system that illustrates a specific exemplary time editing application of the time editing logic according to one embodiment of the present invention;

DETAILED DESCRIPTION

Figure 1:
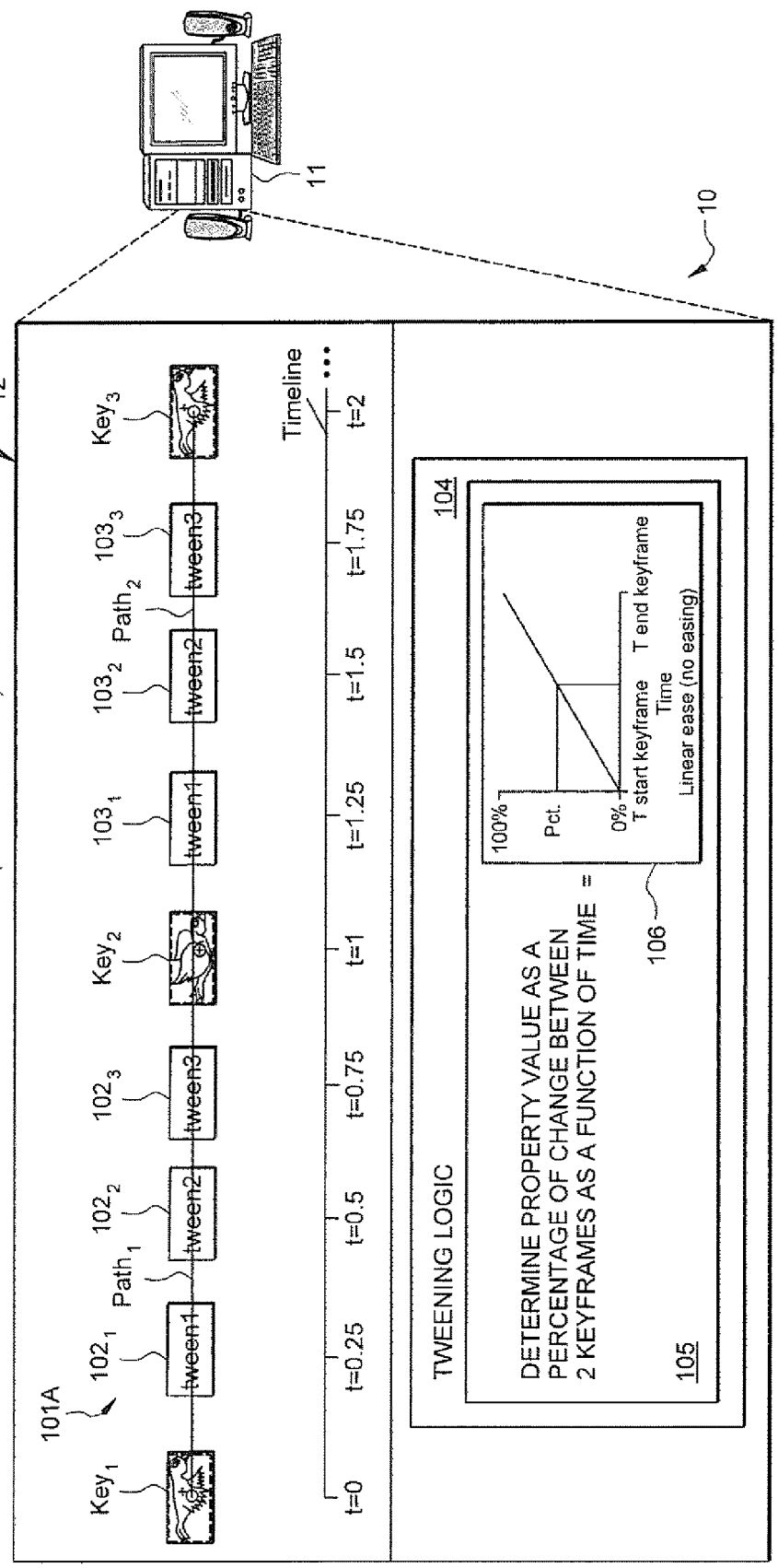
FIG. 1 shows an exemplary illustration of tweening by an animation authoring tool of the prior art.

Turning to FIG. 4, an exemplary system 40 according to one embodiment of the present invention is shown. As shown, system 40 comprises a processor-based computer 11, such as a personal computer (PC), laptop computer, server computer, workstation computer, etc. In this example, an animation authoring tool (or "application") 41 is executing on such a computer 11. While animation authoring tool 41 is shown as executing on computer 11 for ease of illustration in FIG. 4, it should be recognized that such tool may be residing and/or executing either locally on computer 11 or on a remote computer to which computer 11 is communicatively coupled via a communication network, such as a local area network (LAN), the Internet or other wide area network (WAN), etc.

As with the exemplary animation authoring tool 12 described above with FIGS. 1-3, animation authoring tool 41 comprises computer-executable software code stored to a computer-readable medium that is readable by a processor of computer 11 and, when executed by such processor, causes computer 11 to perform the various operations described further herein for such animation authoring tool 41. Examples of such an animation authoring tool 41 include FLASH® and AFTER EFFECTS® animation authoring applications.

As with the traditional animation authoring tool 12 described above, animation authoring tool 41 enables authoring of an animation, such as creating, modifying, and/or otherwise authoring an animation. That is, a user can interact with animation authoring tool 41 to author an animation. Accordingly, animation authoring tool 41 presents a user interface (e.g., to a display of computer 11) with which a user may interact (e.g., via user input devices, such as a keyboard, mouse, etc. of computer 11) for authoring an animation. Further, animation authoring tool 41 may aid the author in generating (e.g., via animation generation logic 407) certain aspects of the animation, such as in generating (via tweening logic 408) tween frames of the animation, as discussed above. In the illustrated example of FIG. 4, an exemplary animation 401 is being authored. Animation 401 comprises a plurality of animation frames 402 that are presented according to a reference timeline 403 of the animation.

According to this exemplary embodiment, animation authoring tool 41 includes time editing logic 404. According to certain embodiments, time editing logic 404 comprises computer-executable software code stored to a computer-readable medium that is readable by a processor of computer 11 and, when executed by such processor, causes computer 11 to perform the various operations described further herein for such time editing logic 404. As discussed further herein, time editing logic 404 is operable to enable editing of a time span across a plurality of non-roving keyframes for at least one property of at least one graphical object included in animation 401. As discussed further herein, time editing logic 404 is operable to do so in certain embodiments because authoring tool 41 forms keyframes for at least one property of at least one graphical object into an editable unit. Thus, the span of keyframes forming an animation (transition of at least one property value) for at least one graphical object may be formed into an editable unit (or "object") by authoring tool 41. Accordingly, as shown in the example of FIG. 1, editable unit 1 (labeled $406_1$) is formed for a first property ("property A"), such as position, of a first graphical object in animation 401, editable unit 2 (labeled $406_2$) is formed for a second property ("property B"), such as rotation, of the first graphical object in animation 401, and editable unit 3 (labeled $406_3$) is formed for a first property ("property A"), such as position, of a second graphical object in animation 401. The editable units $406_1$-$406_3$ comprise computer-readable data stored to a computer-readable medium, such as data storage 405, that is readable by time editing logic 404.

Thus, according to one embodiment of the present invention, in response to an author editing a time span for a given editable unit (e.g., expanding or shortening the time span), the time editing logic 404 may modify the positions on the animation reference timeline for each of a plurality of non-roving keyframes included in the editable unit (or selected portion thereof being edited) so as to maintain their respective time proportionality. Further, tweening logic 408 may then be employed to generate tween frames in between each of the re-positioned non-roving keyframes.

Figure 5A:
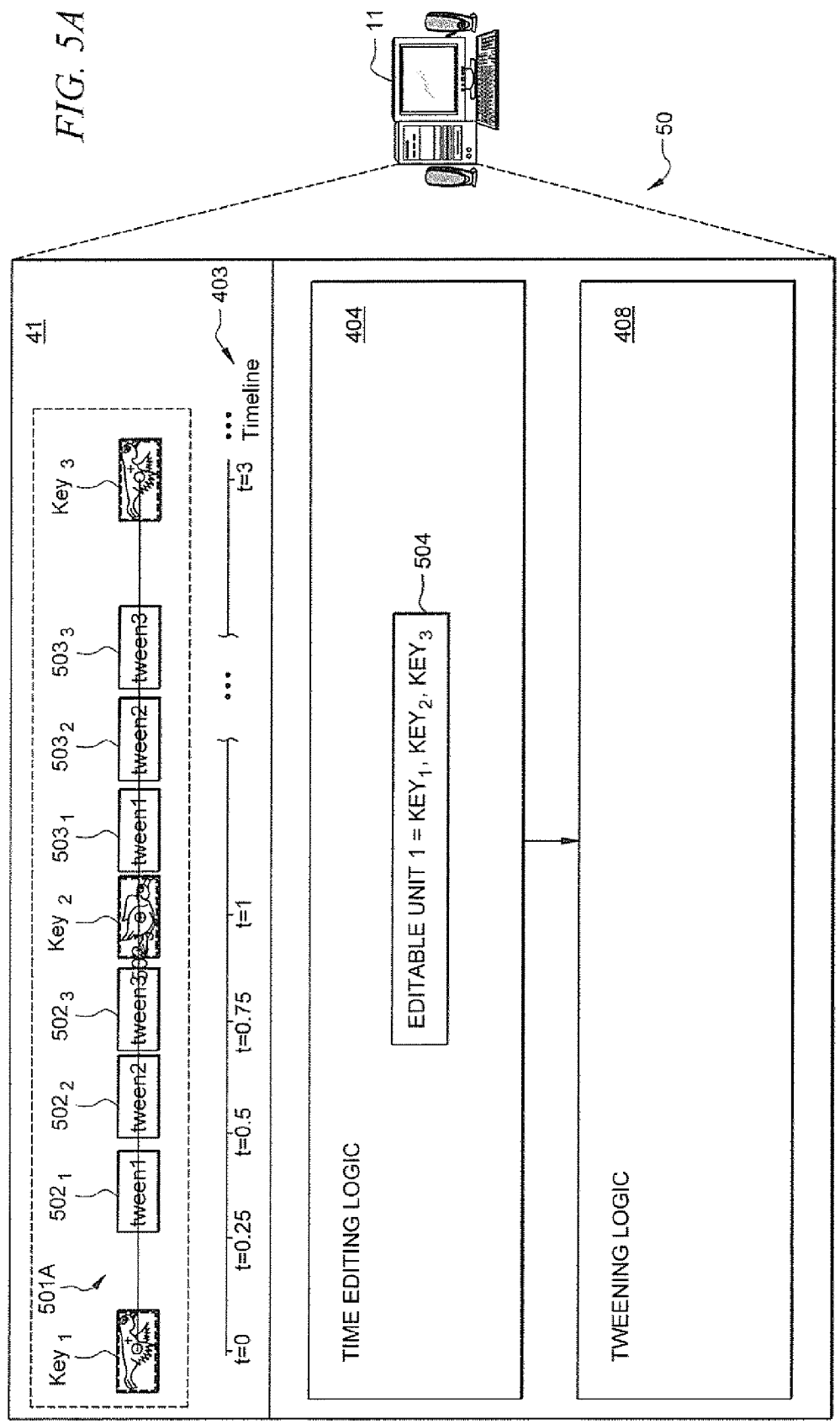
FIGS. 5A-5B show an exemplary system that illustrates a specific exemplary time editing application of the time editing logic according to one embodiment of the present invention.
Figure 5B:
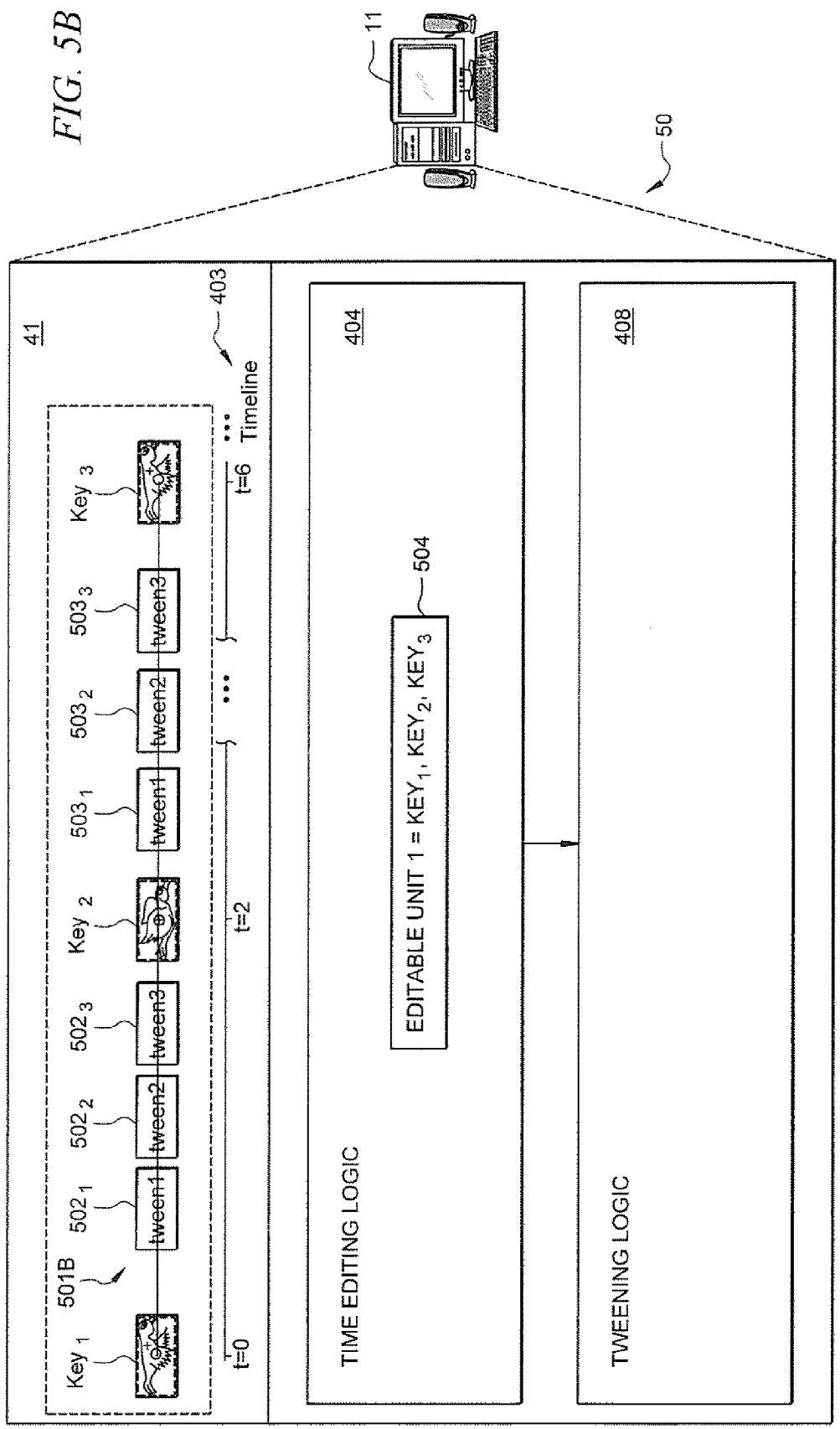

Turning now to FIGS. 5A-5B, an exemplary system 50 illustrates a specific exemplary time editing application of the time editing logic 404 according to one embodiment of the present invention. Again, animation authoring tool 41 is executing on computer 11. In this example, an animation 501A is being authored in which a bird is to fly across the output display. In this example, the author has defined three keyframes $key_1$-$key_3$, where $key_1$ is placed at time t=0 along reference timeline 403, $key_2$ is placed at time t=1 along reference timeline 403, and $key_3$ is placed at time t=3 along reference timeline 403. Tweening logic 408 generates tween frames between keyframe pair ($key_1$, $key_2$), a portion of which are shown as tween frames $502_1$-$502_3$, and tweening logic 408 generates tween frames between keyframe pair ($key_2$, $key_3$), a portion of which are shown as tween frames $503_1$-$503_3$. As discussed above, such tween frames may be generated according to a linear interpolation or according to some easing curve that is employed by tweening logic 408.

Figure 3A:
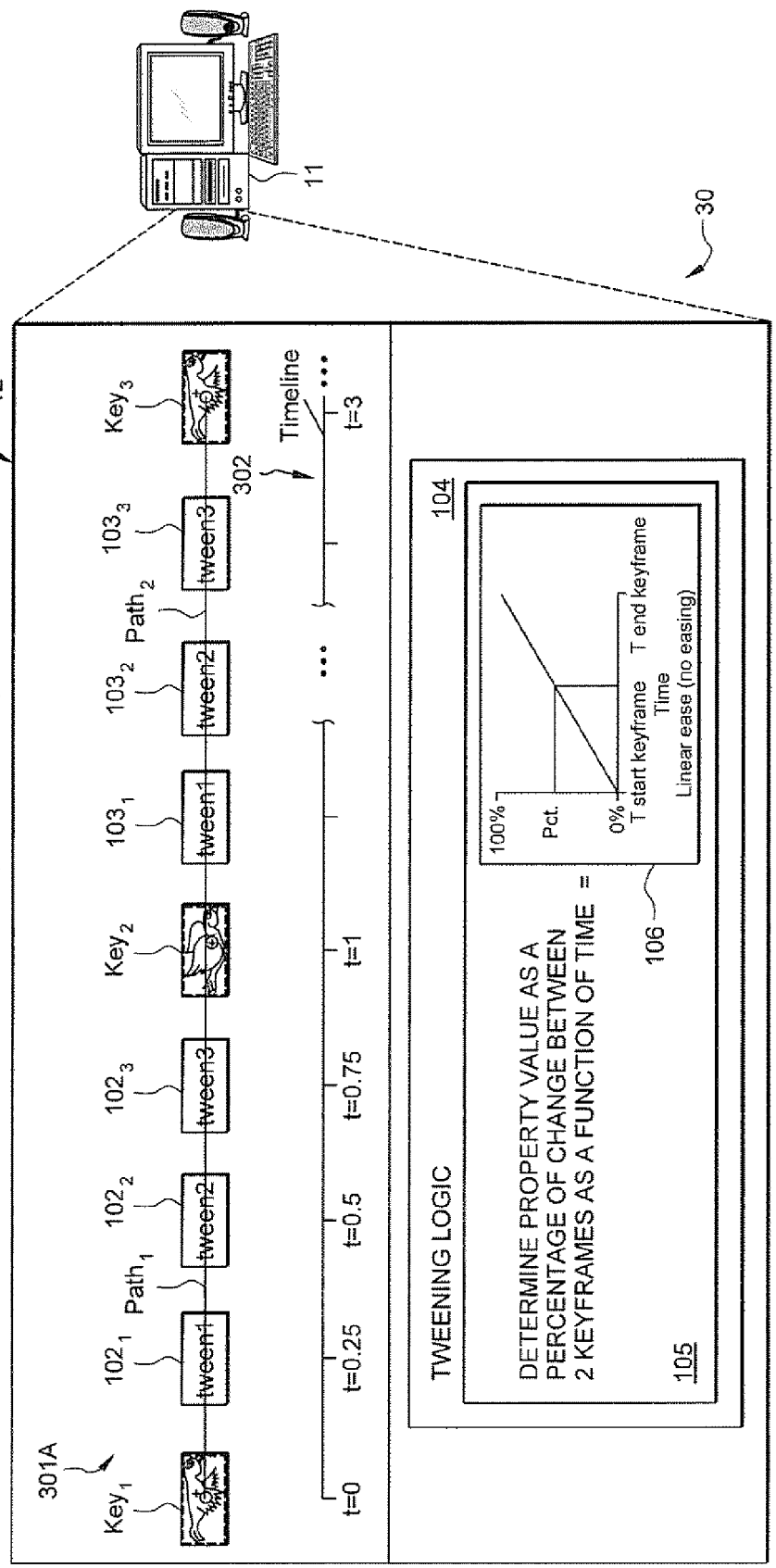
FIGS. 3A-3C illustrate an exemplary scenario of editing individual keyframe pairs according to a traditional animation authoring tool.
Figure 3B:
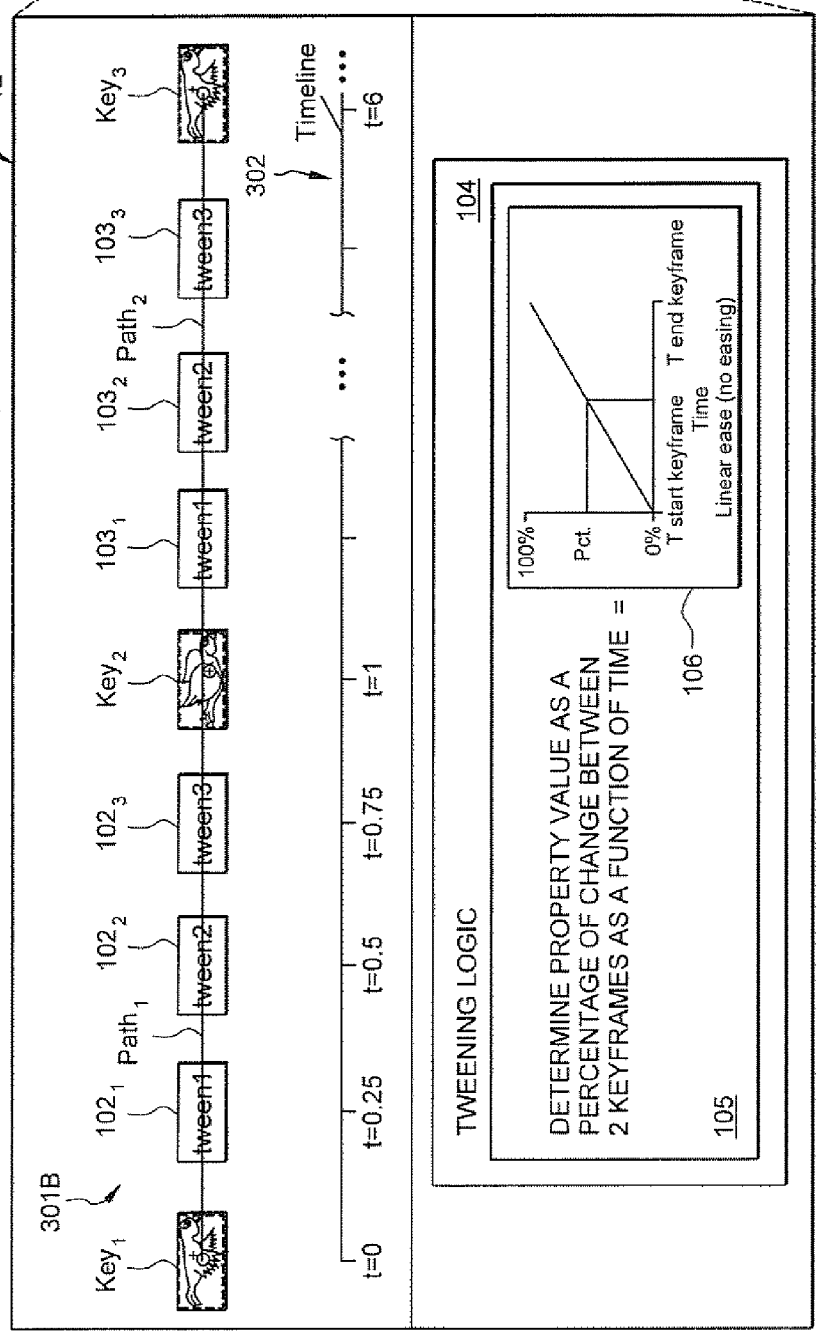
Figure 3C:
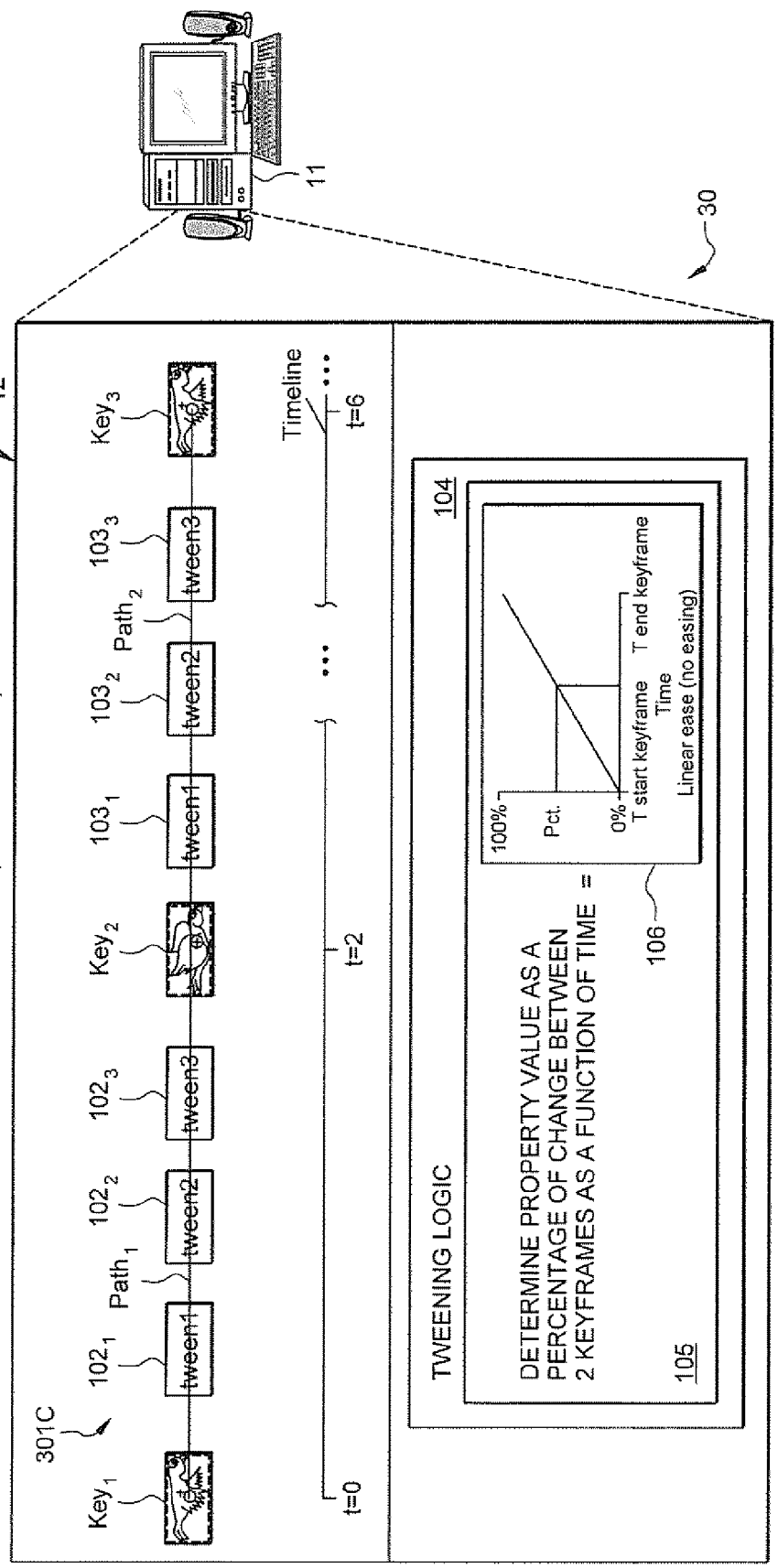

Now, in this example, as in the exemplary scenario discussed with FIGS. 3A-3C above, the author desires to edit the animation 501A to expand its overall length from 3 seconds (i.e., t=3) to 6 seconds. Thus, the author desires to double the overall length of animation 501A such that it takes 6 seconds to complete rather than 3 seconds to complete. Further, the author desires for the relative proportionality between the keyframes to be maintained.

In this example of FIG. 5A, the author selects the animation 501A (e.g., by clicking and dragging a mouse to form a rectangle that encompasses the animation 501A, or otherwise performing some input action to select the animation 501A), and the author inputs a request to expand the time span of such animation 501A. For instance, the author may click and drag keyframe keys in the direction indicated by the arrow of FIG. 5A, the author may interact with reference timeline 403, and/or the author may otherwise input information indicating an amount by which the user desires for the time span of the selected animation 501A to be expanded. As mentioned above, time editing logic 404 supports editing of animation 501A across a plurality of keyframe pairs by, for instance, operating on such animation as a single, editable unit, such as editable unit 504, that is provided by authoring tool 41.

Accordingly, responsive to the author requesting to expand the time span of animation 501A, time editing logic 404 modifies the editable unit 504 to reposition the keyframes key1, key2, and key3 on reference timeline 403 in a manner that maintains their respective proportionality, thereby resulting in modified animation 501B shown in FIG. 5B. For instance, in response to the author dragging keyframe key$_3$ in FIG. 5A to its desired time point (i.e., 6 seconds in this example) along reference timeline 403, time editing logic 404 adjusts the relative time span between each keyframe pair (i.e., (key$_1$, key$_2$) and (key$_2$, key$_3$)) so as to maintain the proportionality of time between the keyframe pairs over the modified time span of the overall animation. Accordingly, in addition to re-positioning keyframe key3 at the new time t=6 of the reference timeline 403, time editing logic 404 also automatically re-positions keyframe key$_2$ to time point t=2 in this example, thereby maintaining the respective proportionality in time for the respective keyframe pairs in resulting animation 501B of FIG. 5B.

Tweening logic 408 may then be utilized to generate the appropriate tween frames between the keyframe pairs having their modified time periods, a portion of which are again shown as tween frames 502$_1$-502$_3$ (between keyframe pair key$_1$, key$_2$) and tween frames 503$_1$-503$_3$ (between keyframe pair key$_2$, key$_3$) in FIG. 5B. Because the time periods have been expanded for each keyframe pair in this example, more tween frames than were generated for animation 501A may be generated in order to provide the desired frame rate for the revised animation 501B.

FIG. 6 shows another exemplary system 60 that illustrates a specific exemplary time editing application of the time editing logic 404 according to one embodiment of the present invention. Again, animation authoring tool 41 is executing on computer 11. In this example, an animation 601 is being authored, which comprises a plurality of graphical objects. That is, the animation 601 comprises a plurality of graphical objects that each have one or more property values that transition from one value to another value over the time span of the animation. The illustrative example comprises a first graphical object of a bird that is to fly across the output display according to its respective motion path 602. The bird's movement is defined by three non-roving keyframes bird_key$_1$, bird_key$_2$, and bird_key$_3$ that are arranged at respective time points along reference timeline 403. Thus, two pairs of keyframes are defined for the bird object's animation: (bird_key$_1$, bird_key$_2$) and (bird_key$_2$, bird_key$_3$). Each of the keyframes defines a corresponding property value for at least one property (e.g., position and/or shape) of the graphical object (i.e., bird in this example) that the graphical object is to possess at the corresponding time point of the reference timeline. For instance, the bird may move along motion path 602 according to the position property defined by the keyframes, and/or the bird may change its shape along that path such that it appears to be flapping its wings according to the shape property defined by the keyframes. Of course, separate keyframe pairs may be employed for defining each of the bird's property values in certain embodiments, but for simplicity both the position and shape transition values are defined in the keyframe pairs shown in this example of FIG. 6. As discussed above, tweening logic 408 generates tween frames between the keyframes to transition the property value from the value at one tween frame to the value at the next keyframe.

The illustrative example of FIG. 6 further comprises a second graphical object of an egg that is to drop from the bird according to its respective motion path 603. The egg's movement is defined by three non-roving keyframes egg_key$_1$, egg_key$_2$, and egg_key$_3$ that are arranged at respective time points along reference timeline 403. Thus, two pairs of keyframes are defined for the egg object's animation: (egg_key$_1$, egg_key$_2$) and (egg_key$_2$, egg_key$_3$). Each of the keyframes defines a corresponding property value for at least one property (e.g., position and/or rotation) of the graphical object (i.e., e.g., in this example) that the graphical object is to possess at the corresponding time point of the reference timeline. For instance, the egg may move along motion path 603 and tumble end over end as it falls according to the rotation defined by the keyframes. Of course, separate keyframe pairs may be employed for defining each of the egg's property values in certain embodiments, but for simplicity both the motion and rotation are defined in the keyframe pairs shown in this example of FIG. 6. As discussed above, tweening logic 408 generates tween frames between the keyframes to transition the property value from the value at one tween frame to the value at the next keyframe.

The illustrative example of FIG. 6 further comprises a third graphical object of a car that is to drive across the output display according to its respective motion path 604. The car's movement is defined by three non-roving keyframes car-_key$_1$, car_key$_2$, and car_key$_3$ that are arranged at respective time points along reference timeline 403. Thus, two pairs of keyframes are defined for the car object's animation: (car-_key$_1$, car_key$_2$) and (car_key$_2$, car_key$_3$). Each of the keyframes defines a corresponding property value for at least one property (e.g., position) of the graphical object (i.e., car in this example) that the graphical object is to possess at the corresponding time point of the reference timeline. As discussed above, tweening logic 408 generates tween frames between the keyframes to transition the property value from the value at one tween frame to the value at the next keyframe.

In the illustrative example of FIG. 6, the animation 601 is intended to show a car driving across the display with a bird flying overhead, where the bird drops an egg that crashes on the car's windshield. Of course, this requires appropriate timing coordination between the various motion path's to appear realistic. According to one embodiment of the present invention, authoring tool 41 forms a corresponding unit for the plurality of keyframe pairs for each of the graphical object's, where the unit comprises data specifying the timing relationship of each keyframe pair of the corresponding graphical object. That is, the unit may specify the respective proportionality of length of time of the keyframe pairs of the corresponding graphical object. Further, separate units may be so defined for each transitional property of each graphical object in the animation 601. For instance, the unit 605 specifies the timing relationship of the plurality of keyframe pairs defined for the position property of the bird object, and the unit 606 specifies the timing relationship of the plurality of keyframe pairs defined for the shape property of the bird object. Similarly, the unit 607 specifies the timing relationship of the plurality of keyframe pairs defined for the position property of the egg object, and the unit 608 specifies the timing relationship of the plurality of keyframe pairs defined for the rotation property of the egg object. And, the unit 609 specifies the timing relationship of the plurality of keyframe pairs defined for the position property of the car object.

Time editing logic 404 permits an author to interact with an interface of authoring tool 41 to modify the time span defined for a given transition property of a given graphical object (where the time span crosses multiple non-roving keyframes), and time editing logic 404 so modifies such time span in a manner that maintains the specified timing relationship of the plurality of keyframe pairs. As an example, suppose that the time span for the drop of the egg is such that it does not arrive at the point on the display at which it is to crash into the windshield of the car object at the same time that the car object arrives at such point on the display. The author may individually select the egg object's position property, and modify its time span across the plurality of keyframe pairs so as to result in the egg object arriving at the crash point on the display at the same time as the car object. When such time span is so modified by the author, the time editing logic 404 references unit 607 to determine the timing relationship between the plurality of keyframe pairs of the egg object, and the time editing logic 404 re-positions each keyframe along the modified time span so as to maintain the specified time proportionality of each keyframe pair. Once these non-roving keyframes are so re-positioned, tweening logic 408 may be employed to generate the appropriate tween frames.

Of course, if the author desires to modify the timing relationship between the keyframe pairs for a given property of a graphical object, the author may individually re-position one or more of the keyframes with respect to the reference timeline 403. In response thereto, the authoring tool 41 updates the timing relationship specified for such property of the graphical object in the corresponding unit. Accordingly, if thereafter the author desires to modify a timing span for the transition of is property of the graphical object that encompasses a plurality of non-roving keyframe pairs, the author may do so and time editing logic 404 can maintain the newly-specified timing relationship (e.g., proportionality) between the keyframe pairs.

Figure 7:
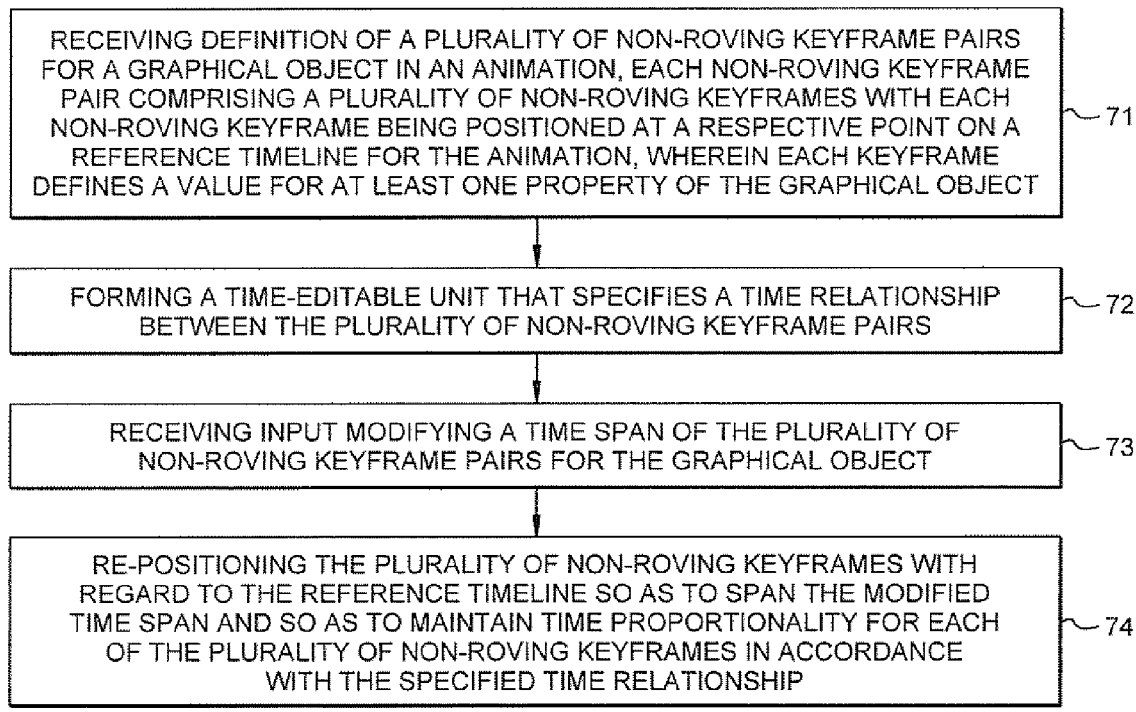
FIG. 7 shows an exemplary operational flow diagram according to one embodiment of the present invention.

FIG. 7 shows an exemplary operational flow diagram according to one embodiment of the present invention. In operational block 71, an animation authoring tool 41 receives a definition of a plurality of non-roving keyframe pairs for a graphical object in an animation. Each non-roving keyframe pair comprises a plurality of non-roving keyframes with each non-roving keyframe being positioned at a respective point on a reference timeline for the animation, wherein each keyframe defines a value for at least one property of the graphical object. Thus, as is well-known in the art, authoring tool 41 permits an author to define non-roving keyframes for at least one property of a graphical object, where such keyframes define values to which the property is to transition at a corresponding time point along the animation's reference timeline.

In operational block 72, the authoring tool 41 forms a time-editable unit that specifies a timing relationship between the plurality of non-roving keyframe pairs. For instance, such a unit may comprise data from which the proportionality of time between the plurality of non-roving keyframe pairs for at least one transitioning property of a graphical object can be determined.

In operational block 73, the authoring tool 41 receives input modifying a time span of the plurality of non-roving keyframe pairs for the graphical object. For instance, an author may interact with a user interface of the authoring tool as discussed above to request to expand or compress the time span of the plurality of non-roving keyframe pairs for at least one transitioning property of a graphical object.

In operational block 74, the authoring tool 41 (e.g., via time editing logic 404) re-positions the plurality of non-roving keyframes with regard to the reference timeline so as to span the modified time span and so as to maintain time proportionality for each of the plurality of non-roving keyframes in accordance with the specified time relationship of its respective unit. Thus, as discussed above, a time span of a transitioning property value that encompasses a plurality of non-roving keyframes can be modified (e.g., expanded or compressed), while maintaining a desired proportional timing relationship between the non-roving keyframe pairs (as defined in step 71). Once the non-roving keyframes are so re-positioned, tweening logic 408 may be employed to generate the appropriate tween frames, and/or other animation generation logic may be employed for the re-positioned non-roving keyframes.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like).

Figure 8:
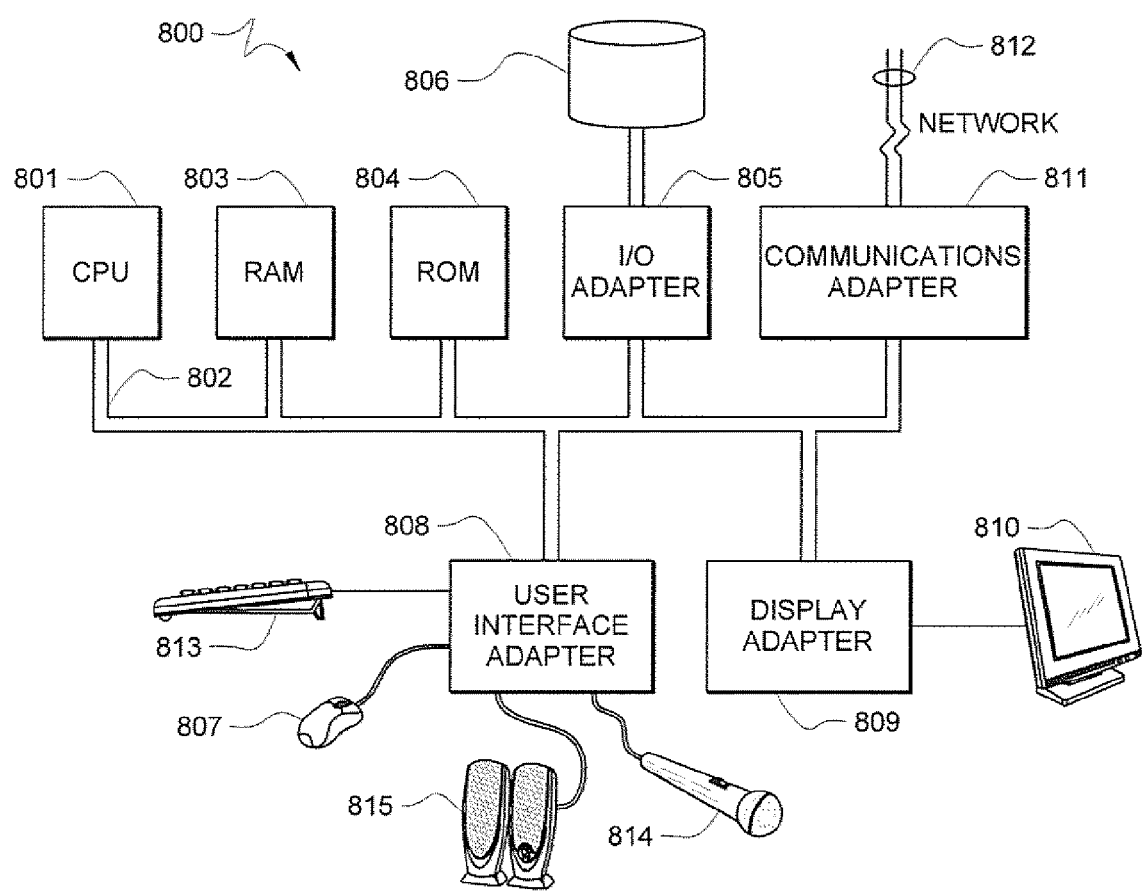
FIG. 8 shows an exemplary system on which an animation authoring tool may be implemented according to one embodiment of the present invention.

FIG. 8 illustrates an exemplary computer system 800 on which animation authoring tool 41 may be implemented according to one embodiment of the present invention. Central processing unit (CPU) 801 is coupled to system bus 802. CPU 801 may be any general-purpose CPU. The present invention is not restricted by the architecture of CPU 801 (or other components of exemplary system 800) as long as CPU 801 (and other components of system 800) supports the inventive operations as described herein. CPU 801 may execute the various logical instructions according to embodiments of the present invention. For example, CPU 801 may execute machine-level instructions according to the exemplary operational flow described above in conjunction with FIG. 7.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 800 and ROM 804 hold user and system data and pro-rams, as is well known in the art.

Computer system 800 also preferably includes input/output (I/O) adapter 805, communications adapter S11, user interface adapter 808, and display adapter 809. I/O adapter 805, user interface adapter 808, and/or communications adapter 811 may, in certain embodiments, enable a user to interact with computer system 800 in order to input information, such as interacting with a user interface of an animation authoring tool 41 to define keyframes of an animation and/or to request modification of a time span that encompasses a plurality of non-roving keyframes of a graphical object, as described above.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for operations of the authoring tool 41. Communications adapter 811 is preferably adapted to couple computer system 800 to network 812, which may enable information to be input to and/or output from system 800 via such network 812 (e.g., the Internet or other wide-area network, a local-area network, a public or private switched telephony network, a wireless network, any combination of the foregoing). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display an animation being authored and/or editing tools provided to an author via an interface of authoring tool 41, according to certain embodiments of the present invention.

It shall be appreciated that the present invention is not limited to the architecture of system 800. For example, any suitable processor-based device may be utilized for implementing authoring tool 41, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving, by an animation authoring tool executed by a processor, a definition of a plurality of non-roving keyframe pairs depicting at least one transitioning property for a graphical object in an animation, each non-roving keyframe pair comprising a plurality of non-roving keyframes with each non-roving keyframe being positioned at a respective point on a reference timeline for the animation, wherein each keyframe comprises an image depicting the graphical object at a point in time on the reference timeline corresponding to a value of the at least one transitioning property;
   forming, by the animation authoring tool, a time-editable unit that comprises data specifying a timing relationship between the plurality of non-roving keyframe pairs depicting the at least one transitioning property;
   receiving, by the animation authoring tool, input modifying a time span for the time-editable unit along the reference timeline;
   re-positioning, by the animation authoring tool, the plurality of non-roving keyframes with regard to the reference timeline so as to span the modified time span and so as to maintain time proportionality for each of the plurality of non-roving keyframes in accordance with the specified timing relationship of the time-editable unit; and
   providing, by the animation authoring tool, the plurality of non-roving keyframe pairs for display.

2. The method of claim 1 wherein said receiving said definition comprises:
   receiving user input specifying said position of each of said non-roving keyframes at respective time points on the reference timeline for the animation.

3. The method of claim 1 wherein said receiving said definition comprises:
   receiving user input specifying, for each of said non-roving keyframes, a corresponding value of at least one property of the graphical object to which the animation is to transition to at the respective time point on the reference timeline at which the non-roving keyframe resides.

4. The method of claim 1 wherein said forming comprises:
   forming said unit that comprises data from which proportionality of time span of the plurality of non-roving keyframe pairs for at least one transitioning property of the graphical object can be determined.

5. The method of claim 1 wherein said receiving input comprises:
   receiving user input to a user interface of an animation authoring tool to request to expand or compress the time span of the plurality of non-roving keyframe pairs for at least one transitioning property of the graphical object.

6. The method of claim 1 further comprising:
   performing tweening to generate tween frames between the re-positioned non-roving keyframes.

7. The method of claim 1, wherein the at least one transitioning property comprises a position of the graphical object.

8. The method of claim 1, wherein the at least one transitioning property comprises a size of the graphical object.

9. The method of claim 1, wherein the at least one transitioning property comprises an orientation of the graphical object.

10. The method of claim 1, further comprising:
    receiving, by the animation authoring tool, a definition of a second plurality of non-roving keyframes comprising a second plurality of keyframes depicting at least one additional transitioning property for the graphical object in an animation;
    forming, by the animation authoring tool, a second time-editable unit that comprises data specifying a second timing relationship between the second plurality of non-roving keyframes depicting the at least one additional transitioning property;
    receiving, by the animation authoring tool, input modifying a second time span for the second time-editable unit along the reference timeline;
    re-positioning, by the animation authoring tool, the second plurality of non-roving keyframes with regard to the reference timeline so as to span the second modified time span and so as to maintain time proportionality for each of the second plurality of non-roving keyframes in accordance with the specified timing relationship of the second time-editable unit, wherein the second plurality of non-roving keyframes is re-positioned independently of the first plurality of the non-roving keyframes; and providing, by the animation authoring tool, the second plurality of non-roving keyframe pairs for display.

11. The method of claim 1, further comprising:

receiving, by the animation authoring tool, a definition of a second plurality of non-roving keyframes comprising a second plurality of keyframes depicting at least one transitioning property for a second graphical object in the animation;

forming, by the animation authoring tool, a second time-editable unit that comprises data specifying a second timing relationship between the second plurality of non-roving keyframes depicting the at least one transitioning property for the second graphical object;

receiving, by the animation authoring tool, input modifying a second time span for the second time-editable unit along the reference timeline;

re-positioning, by the animation authoring tool, the second plurality of non-roving keyframes with regard to the reference timeline so as to span the second modified time span and so as to maintain time proportionality for each of the second plurality of non-roving keyframes in accordance with the specified timing relationship of the second time-editable unit, wherein the second plurality of non-roving keyframes is re-positioned independently of the first plurality of the non-roving keyframes; and providing, by the animation authoring tool, the second plurality of non-roving keyframe pairs for display.

12. A method comprising:

receiving, by an animation authoring tool executed by a processor, input modifying a time span along an animation's reference timeline of at least a portion of an animation, wherein the at least a portion of the animation whose time span is being modified comprises a plurality of non-roving keyframe pairs depicting at least one transitioning property of a graphical object, and wherein each non-roving keyframe pair comprises a plurality of non-roving keyframes, wherein each keyframe comprises an image depicting the graphical object at a point in time on the reference timeline corresponding to a value of the at least one transitioning property;

automatically re-positioning, by the animation authoring tool, the plurality of non-roving keyframes of the non-roving keyframe pairs with regard to the reference timeline so as to span the modified time span and so as to maintain a previously-defined proportionality for each of the plurality of non-roving keyframes; and providing, by the animation authoring tool, the plurality of non-roving keyframe pairs for display.

13. The method of claim 12 further comprising:

forming, by the animation authoring tool, a time-editable unit that comprises data specifying the previously-defined timing relationship between the plurality of non-roving keyframe pairs.

14. The method of claim 12 further comprising:

performing tweening to generate tween frames between the re-positioned non-roving keyframes.

15. A system comprising:

computer-readable medium to which instructions are stored;

processor operable to execute said instructions that when executed by the processor causes the processor to:

receive a definition of a plurality of non-roving keyframe pairs depicting at least one transitioning property for a graphical object in an animation, each non-roving keyframe pair comprising a plurality of non-roving keyframes with each non-roving keyframe being positioned at a respective point on a reference timeline for the animation, wherein each keyframe comprises an image depicting the graphical object at a point in time on the reference timeline corresponding to a value of the at least one transitioning property;

form a time-editable unit that comprises data specifying a timing relationship between the plurality of non-roving keyframe pairs depicting the at least one transitioning property, receive input modifying a time span for the time-editable unit along the reference timeline;

re-position the plurality of non-roving keyframes with regard to the reference timeline so as to span the modified time span and so as to maintain time proportionality for each of the plurality of non-roving keyframes in accordance with the specified timing relationship of the time-editable unit; and provide the plurality of non-roving keyframe pairs for display.

16. The system of claim 15 wherein said receiving said definition comprises:

receiving user input specifying said position of each of said non-roving keyframes at respective time points on the reference timeline for the animation.

17. The system of claim 15 wherein said receiving said definition comprises:

receiving user input specifying, for each of said non-roving keyframes, a corresponding value of at least one property of the graphical object to which the animation is to transition to at the respective time point on the reference timeline at which the non-roving keyframe resides.

18. The system of claim 15 wherein said forming comprises:

forming said unit that comprises data from which proportionality of time span of the plurality of non-roving keyframe pairs for at least one transitioning property of the graphical object can be determined.

19. The system of claim 15 wherein said receiving input comprises:

receiving user input to a user interface of an animation authoring tool to request to expand or compress the time span of the plurality of non-roving keyframe pairs for at least one transitioning property of the graphical object.

20. The system of claim 15 wherein said instructions that when executed by the processor further causes the processor to perform tweening to generate tween frames between the re-positioned non-roving keyframes.

21. A non-transitory computer-readable medium comprising executable instructions encoded thereon which when executed by a computer causes the computer to perform a method comprising:

receiving input modifying a time span along an animation's reference timeline of at least a portion of the animation, wherein the at least a portion of the animation whose time span is being modified comprises a plurality of non-roving keyframe pairs depicting at least one transitioning property of a graphical object, and wherein each non-roving keyframe pair comprises a plurality of non-roving keyframes, wherein each keyframe comprises an image depicting the graphical object at a point in time on the reference timeline corresponding to a value of the at least one transitioning property;

automatically re-positioning the plurality of non-roving keyframes of the non-roving keyframe pairs with regard to the reference timeline so as to span the modified time span and so as to maintain a previously-defined proportionality for each of the plurality of non-roving keyframes; and providing the plurality of non-roving keyframe pairs for display.

22. The non-transitory computer-readable medium of claim 21 further comprising executable instructions encoded thereon that when executed by the computer causes the computer to:

form a time-editable unit that comprises data specifying the previously-defined timing relationship between the plurality of non-roving keyframe pairs.

23. The non-transitory computer-readable medium of claim 21 further comprising executable instructions encoded thereon that when executed by the computer causes the computer to:

perform tweening to generate tween frames between the re-positioned non-roving keyframes.

* * * * *